(12) United States Patent  (10) Patent No.: US 8,212,210 B2
Hargel  (45) Date of Patent: Jul. 3, 2012

(54) IR CAMERA AND METHOD FOR PRESENTING IR INFORMATION

(75) Inventor: Martin Hargel, Årsta (SE)

(73) Assignee: Flir Systems AB, Danderyd (SE)

( * ) Notice: Subject to any disclaimer, the term of this patent is extended or adjusted under 35 U.S.C. 154(b) by 179 days.

(21) Appl. No.: 12/025,068

(22) Filed: Feb. 4, 2008

(65) Prior Publication Data

US 2009/0294666 A1  Dec. 3, 2009

(51) Int. Cl.
  *G01J 5/00* (2006.01)
(52) U.S. Cl. .................................................. 250/330
(58) Field of Classification Search ............ 250/330
  See application file for complete search history.

(56) References Cited

U.S. PATENT DOCUMENTS

| | | | | |
|---|---|---|---|---|
| 5,257,209 A * | 10/1993 | Markandey | ......................... | 701/1 |
| 5,656,813 A * | 8/1997 | Moore et al. | ................... | 250/330 |
| 5,686,889 A * | 11/1997 | Hillis | ............................. | 340/540 |
| 5,852,648 A * | 12/1998 | Miyamoto et al. | .............. | 378/62 |
| 2005/0069207 A1 * | 3/2005 | Zakrzewski et al. | .......... | 382/190 |
| 2006/0289772 A1 * | 12/2006 | Johnson et al. | .......... | 250/370.08 |
| 2008/0036576 A1 * | 2/2008 | Stein et al. | ................. | 340/425.5 |

OTHER PUBLICATIONS

Barron, JL, et al., Performance of Optical Flow Techniques, CVPR, 1991, pp. 236-242.
Gonzalez, R.C. and Woods, R.E., Digital Image Processing (3$^{rd}$ Edition), s.l.: Prentice-Hall Inc., 2006, 36 pages.

* cited by examiner

*Primary Examiner* — David Porta
*Assistant Examiner* — Shun Lee
(74) *Attorney, Agent, or Firm* — Haynes and Boone, LLP

(57) ABSTRACT

A camera arranged to generate an IR image and a visible light image is proposed, said camera comprising a thermal imaging part for registering IR radiation from a first field of view, a visible light imaging part for registering visible light from a second field of view at least partially overlapping with the first field of view, and a processing device for processing the information related to the registered IR radiation and the registered visible light information. The processing device is arranged to identify any moving objects that are detectable by the thermal imaging part and not by the visible light imaging part, and presenting said moving objects, if any, in such a way that they will be easily recognizable by an operator.

16 Claims, 3 Drawing Sheets

IR CAMERA AND METHOD FOR PRESENTING IR INFORMATION

TECHNICAL FIELD

The present invention relates to a camera for providing IR images and visible light images, a method using such a camera, and a computer program product.

BACKGROUND AND RELATED ART

In many applications there is a desire to detect the presence of gas. For example, there is often a need to monitor gas pipes for leakages. Many gases are not visible with visible-light cameras, since they do not absorb light in the visible range.

Cameras exist that are specially adapted for gas detection. Such cameras operate in a wave length range where the gas is easily detectable. Such cameras are specially designed only for gas detection, and will not necessarily work for different types of gas. It would be possible to use an IR camera for imaging gas since gas generally fluctuates, but it will not appear very clearly in the thermal image especially in the case of small amounts of gas. Therefore, there is a need for an IR camera that will assist the operator in identifying the presence of gas in the thermal image.

OBJECT OF THE INVENTION

It is an object of the invention to facilitate the detection of gas in thermal images captured by an IR camera.

SUMMARY OF THE INVENTION

This object is achieved according to the present invention by a camera arranged to generate an IR image and a visible light image, said camera comprising a thermal imaging part for registering IR radiation from a first field of view, a visible light imaging part for registering visible light from a second field of view at least partially overlapping with the first field of view, and a processing device for processing the information related to the registered IR radiation and the registered visible light information, said camera being characterized in that the processing device is arranged to identify any moving objects that are detectable by the thermal imaging part and not by the visible light imaging part, and presenting said moving objects, if any, in such a way that they will be easily recognizable by an operator.

The object is also achieved by a method of presenting information related to IR radiation comprising the following steps:
  registering IR radiation from a first field of view,
  registering visible light from a second field of view at least partially overlapping with the first field of view,
  processing the information related to the registered IR radiation and the registered visible light information, characterized in that it comprises the steps of
  identifying any moving objects that are detectable by the thermal imaging part and not by the visible light imaging part, and
  presenting said moving objects, if any, in such a way that they will be easily recognizable by an operator.

The object is also achieved by a computer program product for use in a processing device arranged to control a camera arranged to generate IR images and visible light images, the camera comprising a thermal imaging part for registering IR radiation from a first field of view, a visible light imaging part for registering visible light from a second field of view at least partially overlapping with the first field of view, said computer program product comprising computer readable code means which, when run in the processing device, will cause the processing device to identify any moving objects that are detectable by the thermal imaging part and not by the visible light imaging part, and presenting said moving objects, if any, in such a way that they will be easily recognizable by an operator.

Hence, the inventive idea based on the recognition of the fact that most moving objects will be detectable both in thermography and in visible light imaging, such as machines or human beings. Other moving objects, such as gas, will be detectable only by thermography. Many IR cameras today also comprise a visible light camera and are arranged to present images that are in some way based on both IR and visible light information.

The object is therefore achieved according to the invention by capturing at least two IR images and at least two visible light images, to identify any moving objects that are detectable with visible light photography and IR photography, respectively. The functions of the processing device are typically controlled by a computer program product stored in the processing device. Preferably, the processing device is arranged to compare a moving object identified in the visible light image to a moving object identified in the thermal image and determine if they represent the same object.

Moving objects in the IR image are potentially gas, which will generally not be detectable in the visible light image. Other moving objects will be detectable both in the IR image and in the visible light image. By identifying the moving objects that appear in both the visible light image and the IR image and eliminating them from the IR image, the remaining moving objects in the IR image are potentially caused by gas. The remaining moving objects, that is, the ones that are only visible in the IR image and not in the visible light image are marked in the IR image, preferably by applying a suitable colour.

The processing device is preferably arranged to determine the presence of a moving object in the visible light image and/or the thermal image, respectively, by obtaining a first image at a first point in time, obtaining a second image at a second point in time, comparing the first and the second image and determining the presence of a moving object based on the difference between the first and the second image. The presence of a moving object may be determined in different ways. For example a difference image between the first and the second image may be established and the presence of any moving object may be determined based on the difference image. Alternatively, the presence of a moving object may be determined based on the "optical flow" method In a preferred embodiment processing device is arranged to filter out small changes between the images to eliminate the effects of camera movements.

Preferably, the processing device is arranged to align and stabilize the visible light image and the thermal image before identifying any moving objects in the images. This will also serve to eliminate the effects of camera movements, which will occur, for example if the camera is hand-held.

The processing device is preferably arranged to compare the moving object in the visible light image and the thermal image on the basis of their position in the respective image, their size and/or their shape. While the size and shape of an object will never coincide completely between an IR image and a visible light image, they should be approximately the same, within certain limits to ensure that what is treated as the same object really is the same object.

BRIEF DESCRIPTION OF THE DRAWINGS

The invention will be described in more detail in the following, by way of example and with reference to the appended drawings in which.

DETAILED DESCRIPTION OF EMBODIMENTS

Figure 1:
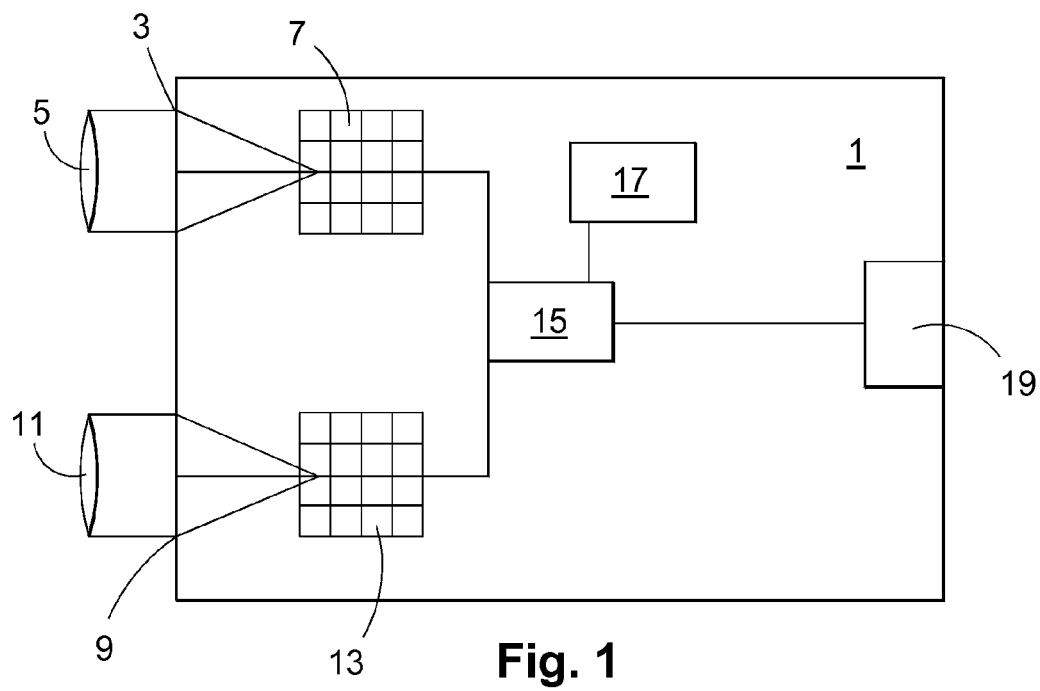
FIG. 1 illustrates a camera that may be used according to the invention.

FIG. 1 shows, schematically, a camera 1 that may be used according to the invention. The camera comprises a first imaging part 3 for capturing thermal images based on IR radiation, The first imaging part comprises optics 5 for focusing IR radiation onto a first focal plane array 7 The camera also comprises a second imaging part 9 for capturing visible light images. The second imaging part 9 comprises optics 11 for focusing visible light onto a second focal plane array 13. The camera 1 also comprises a processing device 15 for receiving and processing IR image data from the first focal plane array 7 and visible light image data from the second focal plane array 13. Each imaging part is devised as is well known in the art. As the skilled person will understand one or more processing units may be arranged between the respective focal plane array 7, 13 and the processing device 15, for processing of image data in ways known in the art. For clarity, however, no such units are shown here. The processing device 15 preferably comprises software having functions for processing the image data received from the imaging parts, to produce image files that can be stored in a memory 17 and/or presented to an operator on a display 19. As will be understood, the processing device 15 could be implemented as two (or more) separate processing devices. The processing device 15 could also be used to perform other functions.

According to the invention, the processing device 15 also comprises software for processing the image data in order to identify objects that change their position between a first and a second visible light image taken at a first and a second point in time t1, t2, respectively, and a first and a second IR image taken at a third and a fourth point in time, t3, t4, respectively, which should be as close as possible to the first and the second point in time t1, t2, respectively. How to achieve this, and how to use the information about the moving objects, will be discussed in more detail in the following.

Figure 2:
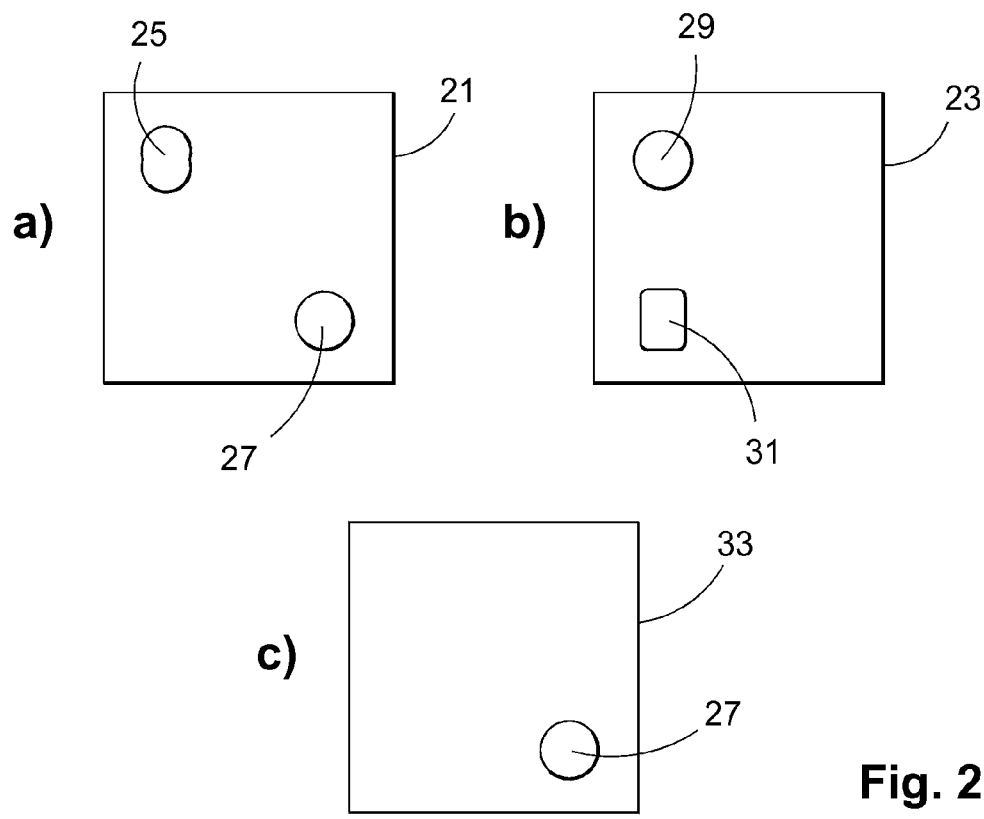
FIG. 2 illustrates schematically an IR image and a visible light image of the same scene and the resulting image after applying the inventive method.

FIG. 2 illustrates in a) an IR image 21, and in b) a visible light image 23 taken of the same scene at the same time. As will be understood the two focal plane arrays 7, 13 have different numbers of pixels, and the pixels have different sizes. Also, the two imaging parts have different fields of view and different optical axes, so that the IR image and the visible light image overlap to a certain extent but not completely.

Further, there is a parallax error between the imaging parts. Therefore, the processing device 15 has functions for compensating for the parallax error and adjust the image sizes so that the two images will overlap as much as possible and that a pixel in one image will correspond to a pixel in the other image. Such functions are known from prior art cameras enabling the display of pictures that are based on both the IR and the visible light information, so called blended, or fused images. It is assumed that the images 21, 23 shown in FIG. 2 a) and b) have been adjusted to be fully overlapping images.

Preferably, as discussed above, at least two IR images are taken at two different points in time and at least two visible light images are taken, at substantially the same two different points in time, to enable the identification of moving objects in each image. This can be achieved in a number of different ways, as will be explained in more detail below.

In the IR image 21 a first 25 and a second 27 moving object have been identified. In the visible light image 23 a third 29 and a fourth 31 moving object have been identified. As can be seen, the first object 25 and the third object 29 are located in essentially the same position in the respective image. Generally, they will not exhibit exactly the same shape, but they should have approximately the same size and shape, within certain limits. If so, it may be determined that they are probably an IR image and a visible light image, respectively, of the same object. Hence, since this moving object is also visible in a visible light image, and by the bare eye, it is not gas, or if it is gas, it can still be detected without using the inventive camera or method. The fourth moving object 31 appears only in the visible light image and can be neglected for the purposes of the invention. The second moving object 27, on the other hand, appears only in the thermal image and may be assumed to represent a flow of gas.

The second moving object 27, being now identified as gas, can be presented in any appropriate way to make it easily identifiable to the operator. It may be displayed as a field of particular colour, shade or intensity in the IR image, in the visible light image, or in any type of blended image. The image 33 denoted c) in FIG. 2 shows the resulting image having only the second moving object, since this is the part of the image that is of interest in the context of the invention. That is, the objects that are visible in both images, or only in the visible light image, have been eliminated. Of course, other objects, or the complete screen, may be displayed as well, but with the second object 27 clearly distinguishable from the rest of the image.

The detection of any moving objects in each of the images may be performed in any way known in the art. For example, a method known as "optical flow" may be used. In this method the velocity vector for each pixel is determined along the rows and the columns, respectively, of the focal plane array 7, 13. This may be difficult to achieve in IR images, because of noise. The optical flow method is described, for example, in Barron, J L, et. al. "Performance of Optical Flow Techniques", CVPR, 1992.

In a preferred embodiment, therefore, an alternative method is used, which comprises determining the difference between two images taken at different points in time and which may be applied to IR images or visible light images. If the difference in a given part of the image is larger than a given threshold, there has very likely been a movement. Hence, there is no need to define each object; instead, the number of moving pixels, and the distance moved can be used to detect and quantify movement.

Since the method is based on detecting moving objects, it is very important that the images themselves have exactly the same field of view, that is, that any movement of the camera is compensated for. Often, especially when the camera is handheld by an operator, the camera is moved or shaken during use. Therefore, an image stabilization method is preferably applied. Several such methods exist, based on optical or mechanical means, or on pure image processing, and any one of these methods can be used with the invention, as long as it produces a stable thermal image and a stable visible light image.

Figure 3:
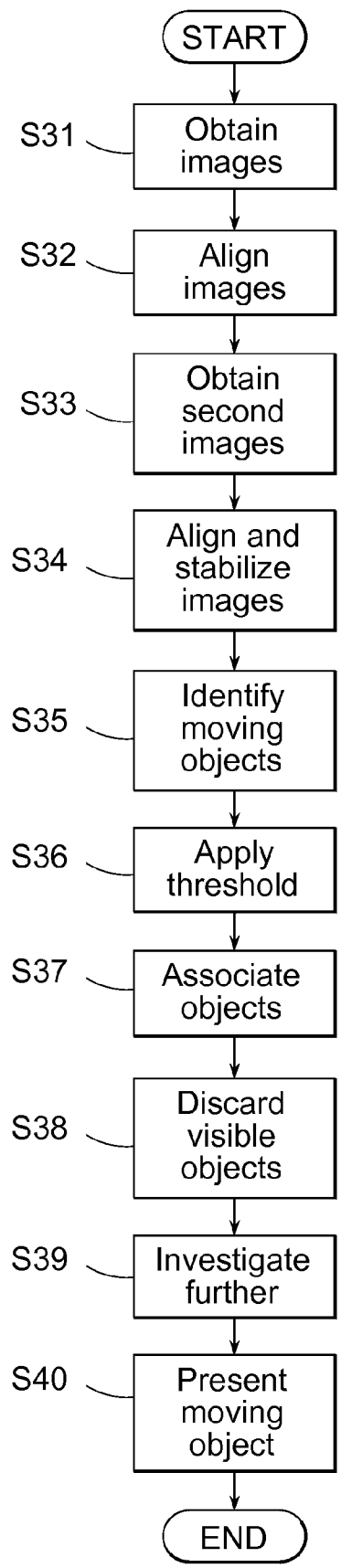
FIG. 3 is a flow chart of a method according to an embodiment of the invention.

FIG. 3 is a flow chart of the method according to a preferred embodiment of the invention. In step S31 a first IR image and a first visible light image are obtained at a first point in time t1. The IR image and the visible light image do not have to be taken at exactly the same point in time, but they should be close enough in time to enable correct identification of moving objects. In step S32 the IR image and the visible light image are aligned in the same way as would be done to produce a blended, or fused image.

In step S33 a second IR image and a second visible light image are obtained at a second point in time t2. In step S34 these images are also aligned in the same way as the first images and stabilized based on comparison with the first images. As discussed above, any image stabilization method may be used, or different methods may be used for the thermal image and the visible light image. In step S35 any moving objects in the visible light image and the thermal image are identified using the first and second visible light image and the first and second thermal image, respectively. As explained above, in a preferred embodiment, a thermal differential image and a visible light differential image are obtained. In step S36 any changes above a certain threshold in each of the differential images are identified as movements. Thresholds may be applied to filter out small changes as well as small areas.

In step S37 the areas in which movements have been identified in each of the differential images are compared and associated with each other if possible. This means determining, for each moving object in the thermal image, whether there is a corresponding object in the visible light image. In step S38 the moving objects that appear in the visible light image are discarded from the image to produce the image shown in FIG. 2c. In step S40, any moving object in the thermal image that does not appear in the visible image is identified as a potential field of gas and is marked in the resulting image, for example, by using a particular colour. In step S39, if desired, further investigation is performed to determine if the moving object identified as gas is really gas.

As will be understood, the order of steps S32 and S33 may be changed. In step S35 alternative methods of identifying movement in the respective image could be applied, for example, the "optical flow" method.

An object will normally not be imaged as having exactly the same size and shape in the thermal image and the visible light image. Therefore, the association of the objects performed in step S37 cannot be based on the requirement that the objects should appear in identical ways in the visible light image and the IR image. Instead it should be based on one or more of the following parameters: The positions in the images taken at the first t1 and second t2 point in time will be essentially the same in both the IR and the visible light images. The position may, for example, be determined based on the centre of the object in the relevant image. The objects should have the same size within a certain margin, for example, the sizes between the objects in the images may not differ by more than a certain percentage. The objects should have the same shape within certain limits, that is, even or uneven edges, extremities, etc. Further, the contours of the object should coincide in both images, within certain limits. As will be understood, once the movement has been identified, the size, shape and position of the moving object could be determined from the images taken at the first point in time t1, the images taken at the second point in time t2 or a combination of them.

Figure 4:
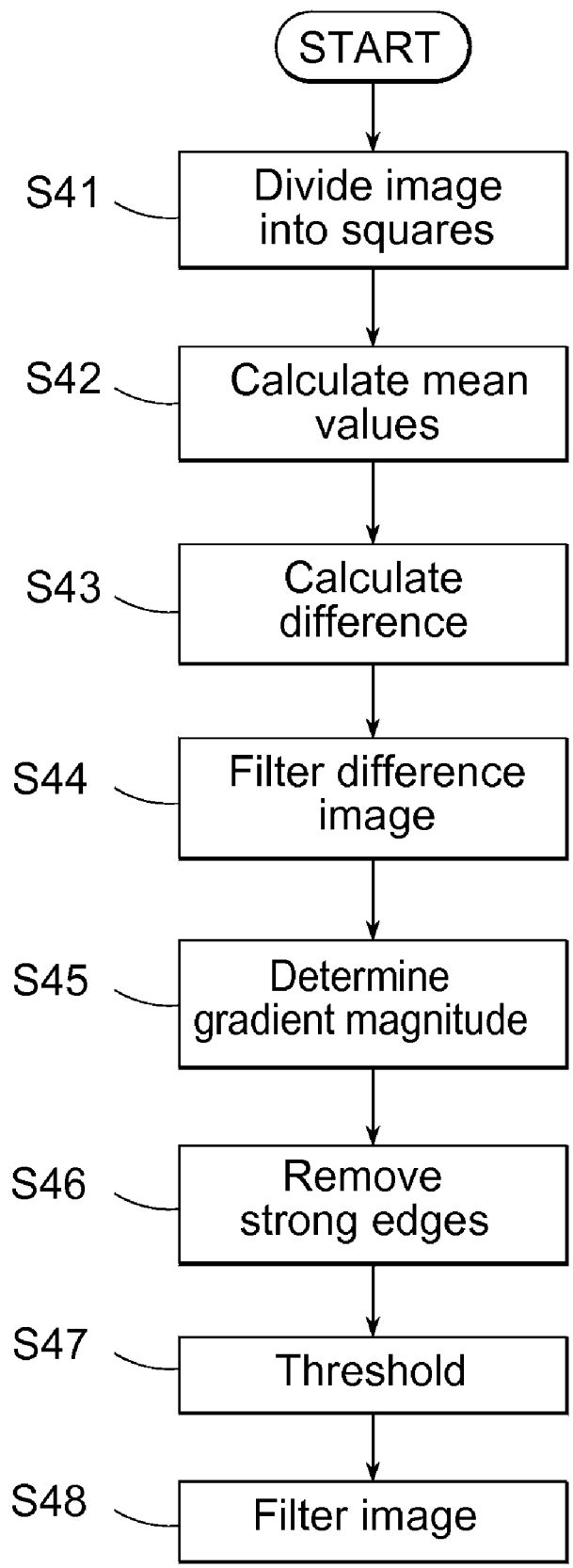
FIG. 4 is a flow chart of a possible method for identifying moving objects.

FIG. 4 is a flow chart of one possible method for identifying moving objects, that is, a more detailed description of one possible embodiment of step S35 of FIG. 3. According to this embodiment, moving objects are identified by finding areas in which the intensity varies strongly between frames. As the skilled person will understand, various modifications to the steps of this method are possible.

In step S41, the image $I_t$ is divided into B×B pixel distinct squares. In step S42, the mean of each square is calculated resulting in an image $Ic_t$ with coarser scale.

For the frame $Ic_t$ the difference from the preceding frame is calculated in step S43.

$$Id_t = Ic_t - Ic_{t-1} \tag{1}$$

In step S44, the resulting image $Id_t$ from step S43 is median filtered using the pixels in a window of size M around each pixel. This is done to reduce the extreme differences likely to be caused by noise and not by diffusing gas.

Depending on the frame rate of the currently used camera the difference between $Ic_t$ and $IC_{t-1}$ could be one or more frames. $Ic_t$ and $Ic_{t-1}$ can also be estimated in step S44 as the mean value of a number of frames.

Now the image obtained from step S44, $Idm_t$, contains values indicating the amount of intensity change. Some of the intensity change is caused by moving objects. But there will also be intensity change if the camera has changed its position in some way, which may be falsely identified as moving objects. This has been compensated for in the stabilization step but only to a certain degree. Basically if one part of the image is perfectly stabilized it does not guarantee that other parts are, due to the depth of the scene. Parts of the scene that are not perfectly stabilized will then contribute to the intensity change. An area with large gradient magnitude will if it is not perfectly stabilized contribute to the intensity change more than an area with smaller gradient magnitude.

Therefore, in step S45, the horizontal and vertical gradient $Ifx_t$ and $Ify_t$ is calculated and then the gradient magnitude $Ig_t$ is determined.

$$Ig_t = \sqrt{Ifx_t^2 + Ify_t^2}$$

The gradient can be estimated in various ways. The most basic method is to approximate the gradient with the central difference of the adjacent pixels. Another method is to use the Sobel operator to convolve the image with two gradient estimating convolution masks.

This step results in the image $Ing_t$.

$$Ing_t = Idm_t - Ig_t$$

Areas with strong edges are less likely to contain gas. Therefore, preferably in step S46, areas having strong edges are identified. Finding strong edges can be done by using one of the common edge detector algorithms, see for example Gonzalez, R. C. and Woods, R. E. *Digital Image Processing* (3rd Edition). s.l.: Prentice-Hall Inc., 2006. The result is a binary image with edges stronger than a certain threshold set to one. By setting the edge threshold to a relatively high value only the strongest edges will survive. This is repeated N times and the resulting images are added together. Consequently the strongest edges will have the intensity N. This intensity image is then filtered with an averaging filter. The resulting image $Ie_t$ is then subtracted from the result from the step S45 (or S44 if S45 is not performed) and a gas probability image is obtained.

$$Igp_t = Ing_t - Ie_t$$

From the procedure above, the image with values corresponding to probable moving gas is obtained. In step S47 a threshold determining a minimum acceptable motion value is applied to the image, to obtain a binary mask identifying areas of movement. In the simplest form, a fixed threshold is used, although it would be possible to use a moving threshold. The threshold is depending on the camera type and frame rate. These are known parameters; therefore a fixed threshold T can be used and the possible benefits of having a moving threshold would be very small. When deciding which threshold to use it should be taken into account that setting a too high threshold will leave the gas undetected whereas setting a too low threshold will be sensitive to noise and small uninteresting image changes.

$$Im_t = Igp_t > T$$

The binary mask that is the result of thresholding contains larger moving regions as well as smaller unconnected regions. Therefore, in step S48 some filtering steps are performed. First the mask is dilated to smooth regions and connect neighboring regions that probably represent the same object. Then small regions are discarded as noise and unlikely to be gas. Small regions are preferably discarded based on the number of pixels in the region.

After the steps performed according to FIG. 4, additional steps may be performed to reduce further the risk of false identification of movement. One problem with motion detection that is related to stabilization is that when the stabilization fails objects that where not supposed to be detected show up as regions after the thresholding step. This occurs quite often in singular frames. Thus a new binary mask based on two consecutive frames may be applied, to reduce the problem.

$$Ims_t = Im_t \& Ims_{t-1}$$

When moving the camera too swiftly, the stabilization algorithm might have troubles to stabilize the images properly. Consequently the image will be full of regions with moving objects. To solve this problem a threshold Tm may be applied. If the quotient between the number of masked pixels in $Ims_t$ and the total number of pixels in $Ims_t$ is above Tm no gas detection will be made.

The invention claimed is:

1. A camera configured to generate an infrared (IR) image and a visible light image, said camera comprising:
a thermal imaging part configured to register IR radiation from a first field of view,
a visible light imaging part configured to register visible light from a second field of view at least partially overlapping with the first field of view, and
a processing device configured to process information related to the registered IR radiation and the registered visible light,
wherein the processing device is configured to compare a moving object identified in the visible light image to a moving object identified in the thermal image and to determine if they represent that same moving object,
wherein the processing device is configured to further eliminate the same moving object that is detectable by the thermal imaging part and by the visible light imaging part to identify thermal-image-only moving objects; and
wherein the processing device is further configured to distinguish moving gas from other types of thermal-image-only moving objects by rejecting thermal-image-only moving objects that have edges above an edge threshold.

2. A camera according to claim 1, wherein the processing device is configured to determine a presence of a moving object in the visible light image and/or the thermal image, respectively, by obtaining a first image at a first point in time, obtaining a second image at a second point in time, comparing the first and the second image, and determining the presence of a moving object based on the difference between the first and the second image.

3. A camera according to claim 1, wherein the processing device is configured to filter out changes in intensity in the images that is below a preset threshold.

4. A camera according to claim 3, wherein the processing device is configured to determine a presence of a moving object in the visible light image and/or thermal image, respectively, by obtaining a first image at a first point in time, obtaining a second image at a second point in time, and determining the presence of a moving object based on a difference image between the first and the second image.

5. A camera according to claim 1, wherein the processing device is configured to determine a presence of a moving object in the visible light image and/or thermal image, respectively, by obtaining a first image at a first point in time, obtaining a second image at a second point in time, and determining the presence of a moving object based on an "optical flow" method.

6. A camera according claim 1, wherein the processing device is configured to align and stabilize the visible light image and the thermal image before identifying any moving objects in the images.

7. A camera according to claim 1, wherein the processing device is configured to compare the moving objects in the visible light image and the thermal image on the basis of their position in the respective image, their size, and/or their shape.

8. A camera according to claim 1, wherein the processing device is further configured to mark any remaining moving objects detectable by the thermal imaging part and not by the visible light imaging part in the processed IR image by applying a suitable color.

9. A non-transitory computer program product stored on a processing device adapted to control a camera configured to generate IR images and visible light images, the camera comprising:
a thermal imaging part configured to register IR radiation from a first field of view,
a visible light imaging part configured to register visible light from a second field of view at least partially overlapping with the first field of view,
said computer program product comprising computer readable code which, when run in the processing device, causes the processing device to:
compare a moving object identified in the visible light image to a moving object identified in the thermal image and to determine if they represent that same moving object;
eliminate the same moving object that is detectable by the thermal imaging part and by the visible light imaging part to identify thermal-image-only moving objects; and
distinguish moving gas from other types of thermal-image-only moving objects by rejecting those thermal-image-only moving objects that have edges above an edge threshold.

10. A computer program product according to claim 9, wherein said computer-readable code is further configured to cause the processing device to filter out changes in intensity in the images that are below a preset threshold.

11. A computer program product according to claim 10, wherein said computer-readable code is further configured to cause the processing device to determine a presence of a moving object in the visible light image and/or the thermal image, respectively, by obtaining a first image at a first point in time, obtaining a second image at a second point in time, comparing the first and the second image, and determining the presence of a moving object based on the difference image.

12. A computer program product according to claim 9, wherein said computer-readable code is further configured to cause the processing device to determine a presence of a moving object in the visible light image and/or thermal image, respectively, by obtaining a first image at a first point in time, obtaining a second image at a second point in time, determining a difference image between the first and the second image, and determining the presence of a moving object based on the difference image.

13. A computer program product according to claim 9, wherein said computer-readable code is further configured to cause the processing device to determine a presence of a moving object in the visible light image and/or thermal image, respectively, by obtaining a first image at a first point in time, obtaining a second image at a second point in time, and determining the presence of a moving object based on an "optical flow" method.

14. A computer program product according to claim 9, wherein said computer-readable code is further configured to cause the processing device to align and stabilize the visible light image and the thermal image before identifying any moving objects in the images.

15. A computer program product according to claim 9, wherein said computer-readable code is further configured to cause the processing device to compare the moving object in the visible light image and the thermal image on the basis of their position in the respective image, their size, and/or their shape.

16. A computer program product according to claim 9, wherein said computer-readable code is further configured to cause the processing device to mark any remaining moving objects detectable by the thermal imaging part and not by the visible light imaging part in the processed IR image by applying a suitable color.

* * * * *